March 11, 1947.  O. H. GRISWOLD  2,417,249
CONSTANT VOLUME CONNECTION FOR FLUID CONDUITS
Filed June 27, 1944  2 Sheets-Sheet 1
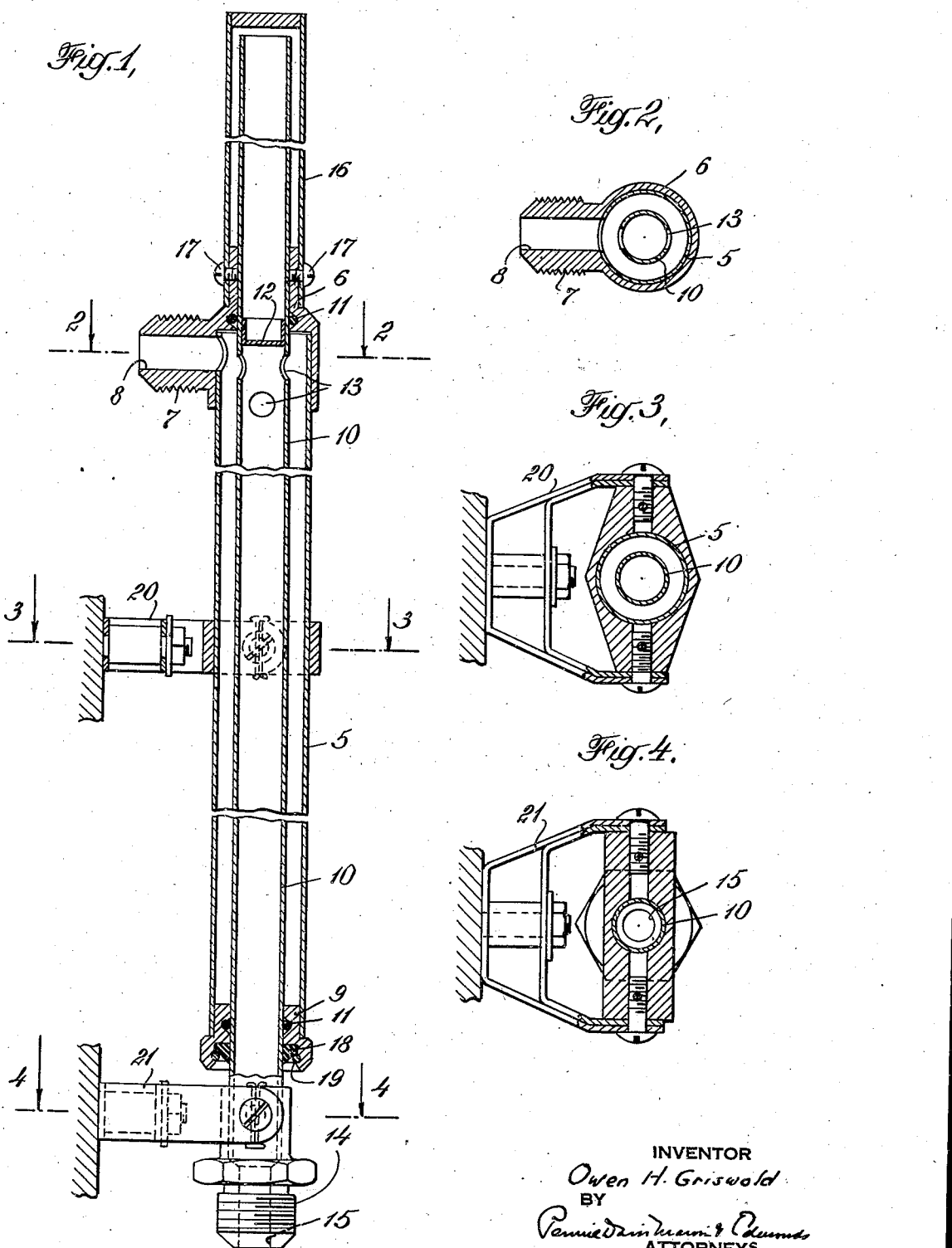
INVENTOR
Owen H. Griswold
BY
ATTORNEYS March 11, 1947.  O. H. GRISWOLD  2,417,249
CONSTANT VOLUME CONNECTION FOR FLUID CONDUITS
Filed June 27, 1944  2 Sheets-Sheet 2
Fig.5,
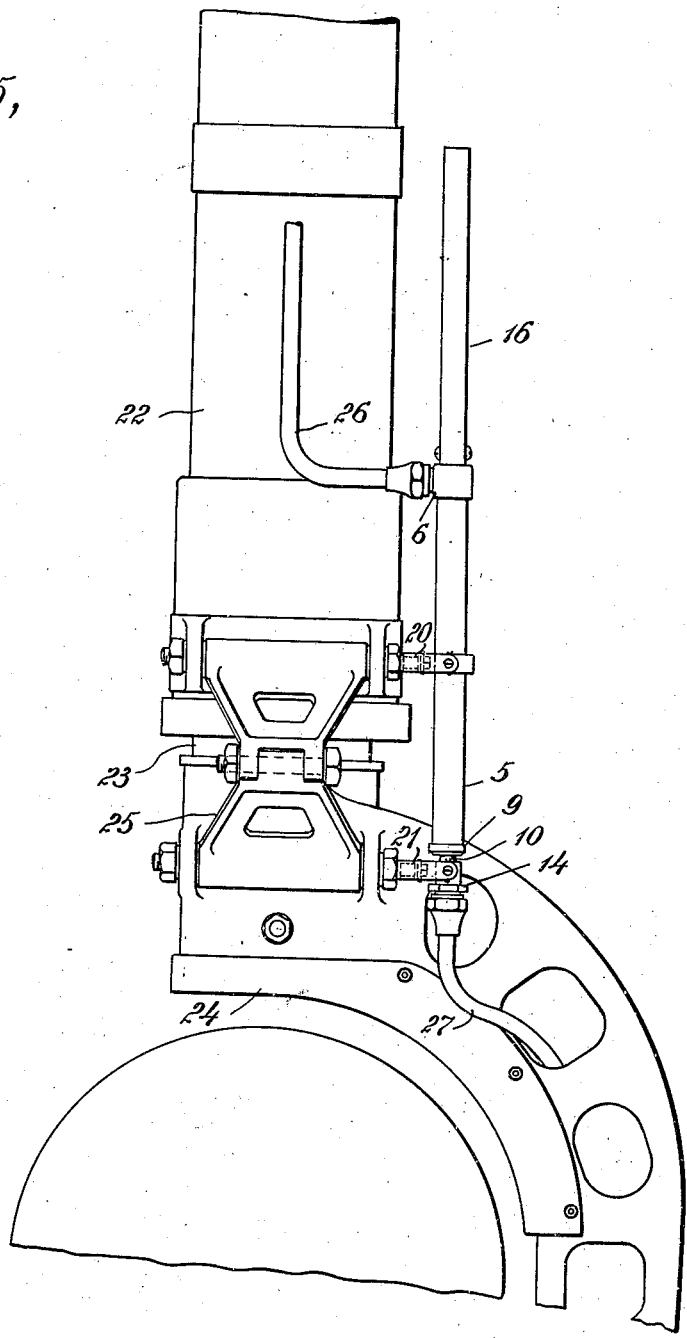
INVENTOR
Owen H. Griswold
BY
Pennie Davis Marvin & Edmonds
ATTORNEYS Patented Mar. 11, 1947

2,417,249

UNITED STATES PATENT OFFICE 2,417,249

CONSTANT VOLUME CONNECTION FOR FLUID CONDUITS

Owen H. Griswold, Trenton, N. J., assignor, by direct and mesne assignments, of one-half to Kaiser Fleetwings, Inc., a corporation of California, and one-half to The Glenn L. Martin Company, Baltimore, Md., a corporation of Maryland Application June 27, 1944, Serial No. 542,274

9 Claims. (Cl. 244—111)

This invention relates to a constant volume connection for fluid conduits adapted for use where fluid under pressure is transmitted between two members of a structure which are not in constant relative position. While the invention is particularly designed to facilitate the application of liquid in hydraulic brake systems for aircraft, it is equally adaptable for use with gases and for general applications where similar conditions obtain.

In aircraft landing gear, each wheel is supported in a suitable frame which is connected for reciprocating movement to the oleo or shock absorbing unit. The brake which is supported on the wheel frame is supplied with fluid from a hydraulic line leading to the source of pressure fluid in the fuselage. Obviously when the aircraft lands there is considerable reciprocating movement between the wheel frame and the shock strut, including the oleo, which is connected to the fuselage.

To avoid changes in volume which would result in inefficient braking, it has been customary to employ either rubber tubing or swivel joints in metallic tubing in the connection between the fluid pressure line and the brake mechanism. Rubber tubing under pressure expands with resulting "spongy" pedal action. Furthermore the tubing deteriorates rapidly, requiring frequent replacement. Also the synthetic rubber which is used to resist chemical action of the brake fluid will not stand up to the temperatures required for winterization. Finally, the tubing is difficult to install because minimum bend radii must be observed and considerable space is required. The use of swivel joints affords no better solution, since three are required together with pipe fittings and supporting structure. The arrangement is costly, requires considerable space, and is difficult to install.

It is the object of the present invention to provide a simple and efficient constant volume connection for fluid lines which permits relative movement of parts upon which the connection is supported.

Another object of the invention is the provision of an improved constant volume connection adapted for use in the hydraulic line supplying fluid under pressure to the hydraulic line operating mechanism of the brake on an aircraft wheel.

Other objects and advantages of the invention will be apparent as it is better understood by reference to the following specification and accompanying drawing, in which Fig. 1 is a longitudinal section through a device embodying the invention;
Fig. 2 is a section on the line 2—2 of Fig. 1;
Fig. 3 is a section on the line 3—3 of Fig. 1;
Fig. 4 is a section on the line 4—4 of Fig. 1; and
Fig. 5 is a diagrammatic illustration in elevation showing the application of the invention to an aircraft landing gear.

Referring to Figs. 1 to 4 inclusive, a hollow metal tube 5 is secured at one end to a fitting 6 having a threaded boss 7 and a passage 8 and at the other end to a fitting 9. An inner hollow tube 10 is slidably supported in the fittings 6 and 9 which are provided with packing 11 preferably of the ring or doughnut type. The two tubes are thus freely movable relatively to each other. A plug 12 is disposed within the inner tube 10 which is provided with openings 13 adjacent to the plug.

The exposed end of the inner tube 10 is provided with a threaded fitting 14 having a passage 15 therethrough. The other end is enclosed by a dust cap 16 secured by screws 17 to the fitting 6. A packing gland ring wiper 18 is secured to the end of the tube 5 by a snap ring 19 and is adapted to wipe the surface of the tube 10 as it reciprocates to prevent entrance of foreign matter through the packing.

The tube 5 carries a universal yoke 20 which is adapted to be secured to any support and permits automatic adjustment of alignment, and the tube 10 carries a similar yoke 21 which may be secured to any part which is movable longitudinally with reference to the support. As the support and connected part reciprocate, the tube 10 will move relatively to the tube 5 in the direction of their longitudinal axes. It will, however, be noted that regardless of the relative positions of the two tubes, the total volume remains the same. Hence, regardless of movement, there can be no pumping action and the fluid pressure in the lines connected to the device is not disturbed.

A particular application of the device is shown in Fig. 5, in which 22 is the oleo of an aircraft landing gear shock strut. The movable member 23 of the oleo is connected to the wheel frame 24, a nut-cracker 25 being provided to maintain alignment. The yoke 20 on the tube 5 is secured to the oleo 22 and the yoke 21 on the tube 10 is similarly secured to the wheel frame 24. A pipe 26 connected to the fitting 6 and to a source of fluid under pressure (not shown) on the aircraft supplies the fluid to the tubes 5 and 10. The fitting 14 on the tube 10 is connected by a pipe 27 to the hydraulic actuating mechanism of the brake (not shown). As the wheel frame 24 reciprocates with reference to the oleo 22, the pressure fluid is supplied to the brake without any change of volume at the connection. Hence the brakes can be used effectively when they are most needed.

The details of the mechanism for supplying hydraulic fluid under pressure and the brake and its actuating mechanism are well known in the art and form no part of the present invention. Hence no further description thereof is necessary.

Numerous advantages can be cited for the herein described invention when applied as a brake line connection on aircraft. The unit is all metal except for the sealing rings. Therefore, there are no expansion difficulties, nor deterioration due to the chemical action of the oil or temperature change. The unit is small and fits parallel to the strut which assures easy installation since there are no joints or ends projecting out from the oleo. Installation can be accomplished in a minimum amount of time, and the weight of the unit is somewhat less than the conventional type of installation. Finally, the unit is so designed that only one set of universal parts is needed since modification in assembly permits adaptability to any airplane.

Various changes may be made in the details of the device and in its application without departing from the invention or sacrificing the advantages thereof.

I claim:

1. In a constant volume connection for fluid conduits, a pair of tubular telescoping and intercommunicating members, the inner member extending beyond each end of the outer member, each member having means to permit the movement of fluid thereto and therefrom, the inner member having such means at one extending end thereof, and packing between each pair of opposite ends of the members to prevent the escape of fluid, a plug in the inner member at a point substantially spaced from the other extending end of the inner member, that end being adapted to engage the adjacent packing when the members are extended whereby the total volume of the members remains uniform regardless of their relative movement.

2. In a constant volume connection for fluid conduits, a pair of tubular telescoping and intercommunicating members, the inner member extending beyond each end of the outer member, each member having means to permit the movement of fluid thereto and therefrom, the inner member having such means at one extending end thereof, packing between each pair of opposite ends of the members to prevent the escape of fluid, a plug in the inner member at a point substantially spaced from the other extending end of the inner member, that end being adapted to engage the adjacent packing when the members are extended whereby the total volume of the members remains uniform regardless of their relative movement, and a dust cap surrounding the plugged end of the inner member and secured to the outer member.

3. In a constant volume connection for fluid conduits, a pair of tubular telescoping and intercommunicating members, the inner member extending beyond each end of the outer member, each member having means to permit the movement of fluid thereto and therefrom, the inner member having such means at one extending end thereof, packing between each pair of opposite ends of the members to prevent the escape of fluid, a plug in the inner member at a point substantially spaced from the other extending end of the inner member, that end being adapted to engage the adjacent packing when the members are extended whereby the total volume of the members remains uniform regardless of their relative movement, and a wiper secured to one end of the outer member and engaging the periphery of the inner member.

4. In a constant volume connection for fluid conduits, a pair of tubular telescoping and intercommunicating members, the inner member extending beyond each end of the outer member, each member having means to permit the movement of fluid thereto and therefrom, the inner member having such means at one extending end thereof, packing between each pair of opposite ends of the members to prevent the escape of fluid, a plug in the inner member at a point substantially spaced from the other extending end of the inner member, that end being adapted to engage the adjacent packing when the members are extended whereby the total volume of the members remains uniform regardless of their relative movement, a dust cap surrounding the plugged end of the inner member and secured to one end of the outer member, and a wiper secured to the other end of the outer member and engaging the periphery of the inner member.

5. In a constant volume connection for aircraft hydraulic brake systems, the combination of a shock-absorbing strut, a wheel frame, a pair of tubular telescoping and intercommunicating members mounted respectively on the shock-absorbing strut and the wheel frame, the inner member extending beyond each end of the outer member, connections to deliver fluid under pressure to and from the members, the inner member having such means at one extending end thereof, and packing between each pair of opposite ends of the members to prevent escape of fluid, the other extending end of the inner member being plugged and adapted to engage the adjacent packing when the members are extended whereby the total volume of the members remains uniform regardless of their relative movement.

6. In a constant volume connection for aircraft hydraulic brake systems, the combination of a shock-absorbing strut, a wheel frame, a pair of tubular telescoping and intercommunicating members mounted respectively on the shock-absorbing strut and the wheel frame, the inner member extending beyond each end of the outer member, connections to deliver fluid under pressure to and from the members, the inner member having such means at one extending end thereof, packing between each pair of opposite ends of the members to prevent escape of fluid, the other extending end of the inner member being plugged and adapted to engage the adjacent packing when the members are extended whereby the total volume of the members remains uniform regardless of their relative movement, and a dust cap surrounding the plugged end of the inner member and secured to the outer member.

7. In a constant volume connection for aircraft hydraulic brake systems, the combination of a shock-absorbing strut, a wheel frame, a pair of tubular telescoping and intercommunicating members mounted respectively on the shock-absorbing strut and the wheel frame, the inner member extending beyond each end of the outer member, connections to deliver fluid under pressure to and from the members, the inner member having such means at one extending end thereof, packing between each pair of opposite ends of the members to prevent escape of fluid, the other extending end of the inner member being plugged and adapted to engage the adjacent packing when the members are extended whereby the total volume of the members remains uniform regardless of their relative movement, and a wiper secured to one end of the outer memebr and engaging the periphery of the inner member.

8. In a constant volume connection for aircraft hydraulic brake systems, the combination of a shock-absorbing strut, a wheel frame, a pair of tubular telescoping and intercommunicating members mounted respectively on the shock-absorbing strut and wheel frame, the inner member extending beyond each end of the outer member, connections to deliver fluid under pressure to and from the members, the inner member having such means at one extending end thereof, packing between each pair of opposite ends of the members to prevent escape of fluid, the other extending end of the inner member being plugged and adapted to engage the adjacent packing when the members are extended whereby the total volume of the members remains uniform regardless of their relative movement, a dust cap surrounding the plugged end of the inner member and secured to one end of the outer member, and a wiper secured to the other end of the outer member and engaging the periphery of the inner member.

9. In a constant volume connection for fluid conduits, a pair of tubular telescoping and intercommunicating members, the inner member extending beyond each end of the outer member, each member having means to permit the movement of fluid thereto and therefrom, the inner member having such means at one extending end thereof, and packing between each pair of opposite ends of the members to prevent the escape of fluid, the other extending end of the inner member being plugged and adapted to engage the adjacent packing when the members are extended whereby the total volume of the members remains uniform regardless of their relative movement.

OWEN H. GRISWOLD.

REFERENCES CITED

The following references are of record in the file of this patent:

UNITED STATES PATENTS

| Number | Name | Date |
| --- | --- | --- |
| 853,974 | Hayden | May 21, 1907 |
| 2,368,137 | Harmon | Jan. 30, 1945 |
| 2,246,565 | Abercrombie | June 24, 1941 |
| 1,852,129 | Ronan | Apr. 5, 1932 |

FOREIGN PATENTS

| Number | Country | Date |
| --- | --- | --- |
| 812,993 | French | Feb. 15, 1937 |